United States Patent [19]

Misawa et al.

[11] 3,913,217

[45] Oct. 21, 1975

[54] METHOD OF PRODUCING A SEMICONDUCTOR DEVICE

[75] Inventors: Yutaka Misawa; Hideyuki Yagi, both of Hitachi, Japan

[73] Assignee: Hitachi, Ltd., Japan

[22] Filed: July 26, 1973

[21] Appl. No.: 382,691

[30] Foreign Application Priority Data

Aug. 9, 1972 Japan ................................ 47-79117

[52] U.S. Cl. ....................... 29/580; 29/589; 29/590; 156/17; 156/344

[51] Int. Cl.² ....................... B01J 17/00; H01L 7/00

[58] Field of Search ............ 29/578, 580, 583, 589, 29/590; 156/7, 16, 17, 344

[56] References Cited

UNITED STATES PATENTS

| | | | |
|---|---|---|---|
| 3,416,224 | 12/1968 | Armstrong et al. | 29/578 X |
| 3,432,919 | 3/1969 | Rosvold | 29/578 |
| 3,508,980 | 4/1970 | Jackson et al. | 29/578 X |
| 3,608,186 | 9/1971 | Hutson | 29/583 |
| 3,681,139 | 8/1972 | Jannett et al. | 156/344 |
| 3,720,997 | 3/1973 | Black et al. | 29/583 |
| 3,768,150 | 10/1973 | Sloan et al. | 29/580 X |
| 3,771,219 | 11/1973 | Tuzi et al. | 29/580 X |

*Primary Examiner*—Roy Lake
*Assistant Examiner*—Craig R. Feinberg
*Attorney, Agent, or Firm*—Craig & Antonelli

[57] ABSTRACT

A large-area semiconductor wafer with a backing member attached on one of its principal surfaces is divided into a plurality of small-area semiconductor pellets. A glass film is coated on the selected surface of each pellet and thereafter the pellets are detached from the backing member.

10 Claims, 13 Drawing Figures

METHOD OF PRODUCING A SEMICONDUCTOR DEVICE

Figure 1:
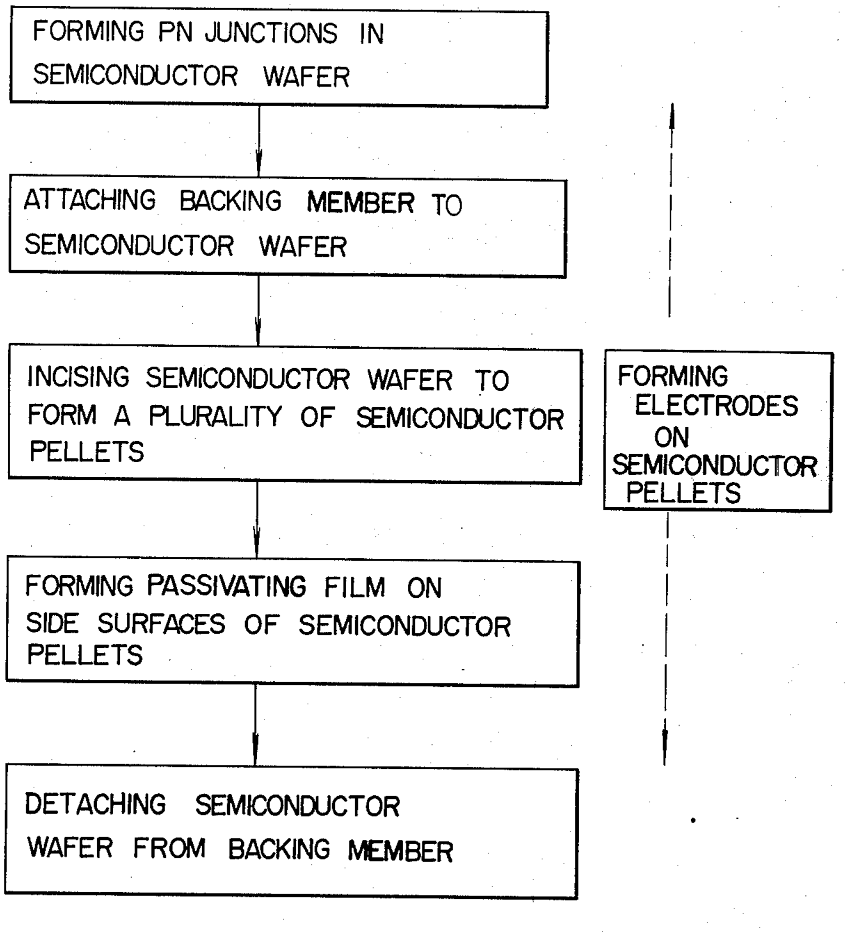

The present invention relates to a method of producing a semiconductor device.

Semiconductor devices can be classified into three groups, i. e. planar type, mesa type and bevel type, depending upon the structure of an PN junction (formed between P-type and N-type regions). The planar type device is one in which all the edges of the PN junctions appear in one principal surface of the semiconductor pellets. The mesa type device has around one principal surface of its semiconductor pellet an etched-down surface in which the edges of the PN junctions appear. In the bevel type device, the edges of the PN junctions appear in the side surface of the semiconductor pellet. The side surface is a plane which crosses the PN junction planes perpendicularly or obliquely. The planar or mesa structure is suitable for the device fabricated by dividing a large-area semiconductor wafer into a plurality of pellets and therefore used for small-power semiconductor device. The bevel structure is suitable for the power semiconductor device having a large-area semiconductor pellet greater than that of the mesa or planar type device.

The exposed edges of the PN junctions in the semiconductor pellet are active and easily affected by the atmosphere so that it is necessary to cover the exposed edges of the PN junctions with an insulating material so as to passivate or protect the edges. The coating of the insulating material is called a passivating film. In the planar or mesa type semiconductor device, such a passivating film can be formed before dividing a large-area semiconductor wafer into a plurality of pellets so that the operation efficiency in forming the passivating film is very high. In the bevel type semiconductor device, on the other hand, the passivating film must be formed after the division of the wafer into a plurality of pellets. Since advanced techniques and much labor are needed to form the passivating film on a semiconductor pellet having a small area with accuracy, the operation efficiency in the case of the bevel type device is lower than in the case of the planar and mesa type devices.

Now, the breakdown voltages of the devices of the types described above are compared. The planar type device has bent portions in the PN junctions and electric field is intense at the bent portions. Moreover, the impurity concentration gradient is high near the exposed edges of the PN junctions so that the spread of space-charge layer is suppressed near the exposed edges. Consequently, it is difficult to fabricate a planar type device having a high breakdown voltage. The breakdown voltage attainable with a planar type device is usually 300 to 400V. In order to obtain a planar type device having a higher breakdown voltage, it is necessary to provide a region called a guard ring which encloses the exposed edges of the PN junctions but is kept apart from the PN junctions. The number of guard rings to be provided must be increased with the increase in the breakdown voltage. Therefore, the increase in size is inevitable if a planar type device having a high breakdown voltage is desired.

With the mesa type device in which there is no bent portion in the PN junction and in which the impurity concentration gradient near the edges of the PN junctions is lower than in the planar type device, a breakdown voltage of about 600V can be attained. For a higher breakdown voltage, it is necessary to increase the surface of the intermediate high resistance layer exposed due to the mesa structure or to increase the depth of etching-down. According to the former artifice, a larger semiconductor pellet must be used so that the completed device has a larger size. On the other hand, the latter artifice cannot be used to produce a large-area semiconductor device. Namely, the etched-down surface of the mesa type device has a curve which renders the area of the plane of a region having a low impurity concentration, parallel to the PN junctions larger than the area of the PN junction plane.

In the case where the PN junction appears in the curved surface, therefore, the breakdown voltage can be increased with the decrease in the angle of inclination of the curved surface. Consequently, in order to obtain a mesa type device having a higher breakdown voltage, it is necessary to decrease the angle of inclination of the curved surface. In this case, however, the curved surface has a large area so that the increase in size is inevitable, as in case of the planar type device. In the case where the depth of the etching-down is increased, the method suitable for mass production cannot be employed in which a large-area semiconductor wager, after having been provided with PN junctions, passivating film and electrodes, is divided into a plurality of semiconductor pellets. Namely, in the application of the above described method, the semiconductor pellets must be connected with one another by the remaining portions of the wafer having a thickness of more than 150$\mu$, even afer the predetermined etching. If the portions have a thickness of less than 150$\mu$, they may be bent or broken during treatment so that the wafer can no more be treated as a large-area semiconductor. In order to make such a treatment possible, it is necessary to increase the thickness of the semiconductor wafer and especially that of the high resistance layer. The increase in the thickness of the high resistance layer is accompanied by the deteriorations in characteristics such as the increase in the internal power loss and the decrease in the operational speed. In the bevel type device, since the gradient angle of the side surface in which the PN junctions appear can be so determined that the area of the plane surface of the region having a high impurity concentration and being parallel to the PN junction plane may be made large enough, then there is no need for decreasing the angle between the PN junction and the side surface though it is necessary in the mesa type device to decrease the angle so as to obtain a higher breakdown voltage. Thus, the breakdown voltage can be increased without increasing the size of the device. As described above, however, the method of fabrication suitable for mass production cannot be employed in which PN junctions, passivating films and electrodes are formed on a large-area semiconductor wafer and thereafter the wafer is divided into a plurality of pellets.

It is therefore one object of the present invention is to provide a method of producing a semiconductor device having a high breakdown voltage.

Another object of the present invention is to provide a method of producing a semiconductor device of bevel type, applicable to mass production system.

An additional object of the present invention is to provide a method of producing a semiconductor device of bevel type in which PN junctions, passivating films and electrodes are formed on a large-area semiconductor wafer and thereafter the wafer is divided into a plurality of pellets.

A further object of the present invention is to provide a method of producing a semiconductor device of bevel type in which the side surfaces of the pellets are coated with glass films.

Yet another object of the present invention is to provide a method of producing a semiconductor device in which the electrophoretic method or the sedimentation method can be used to form glass film.

Yet an additional object of the present invention is to provide a method of producing a semiconductor device having a small size and a high breakdown voltage.

According to one aspect of the present invention, there is provided a method of producing a semiconductor device, comprising a first step of forming desired PN junctions in a large-area semiconductor wafer, a second step of attaching a backing member to one of the principal surfaces of said semiconductor wafer, a third step of incising selectively said semiconductor wafer from the other principal surface said one principal surface to form a plurality of small-area semiconductor pellets each having at least one PN junction exposed in the surface formed due to the incision, a fourth step of forming a passivating film on that surface of each semiconductor pellet formed due to the incision, a fifth step of detaching said semiconductor pellets from said backing member, and a sixth step of forming electrodes on said semiconductor pellets between said first and fifth steps.

Figure 2A:
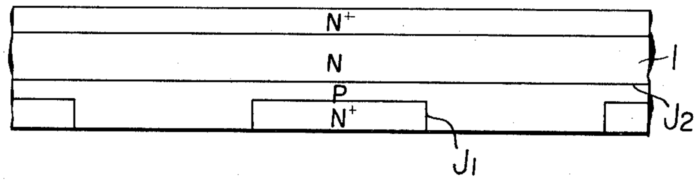
Figure 2B:
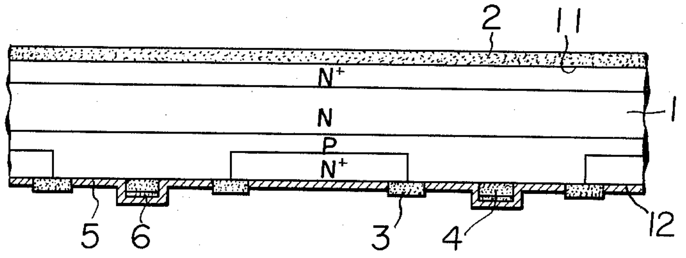
Figure 2C:
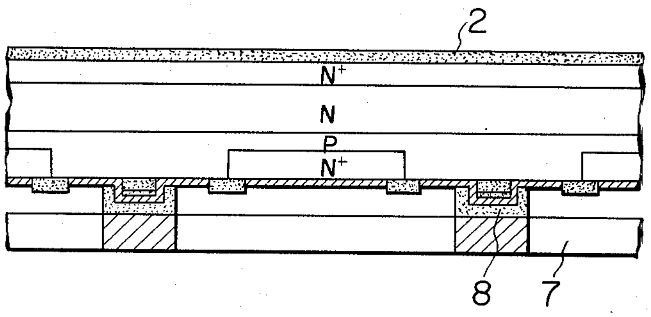
Figure 2D:
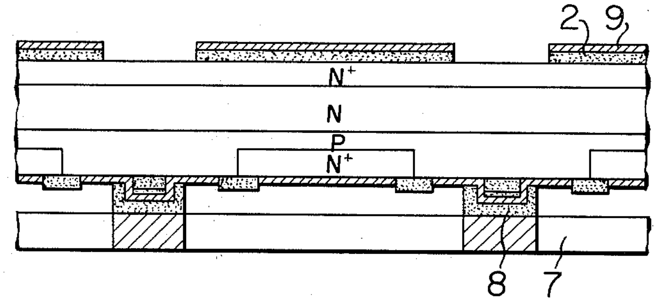
Figure 2E:
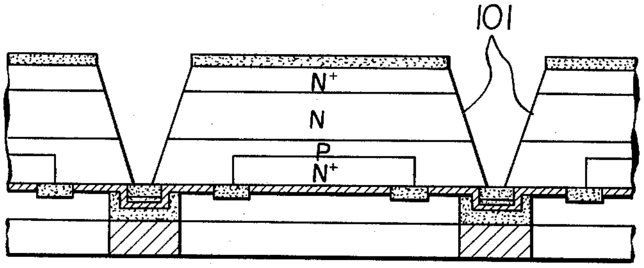
Figure 2F:
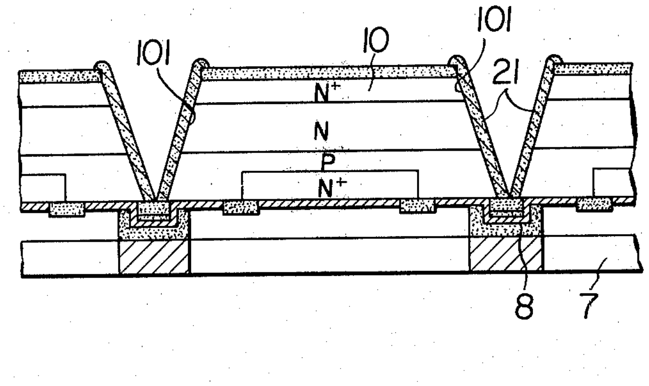
Figure 2G:
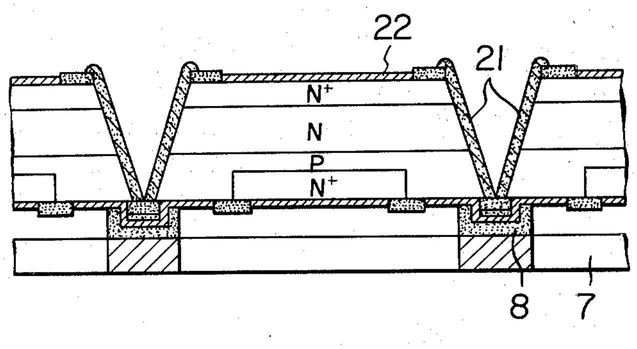
Figure 2H:
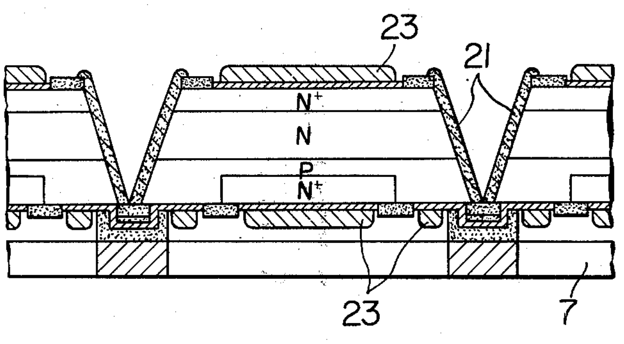
Figure 2I:
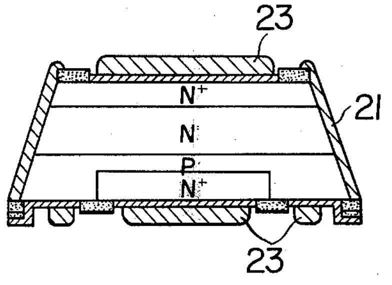
Figure 3A:
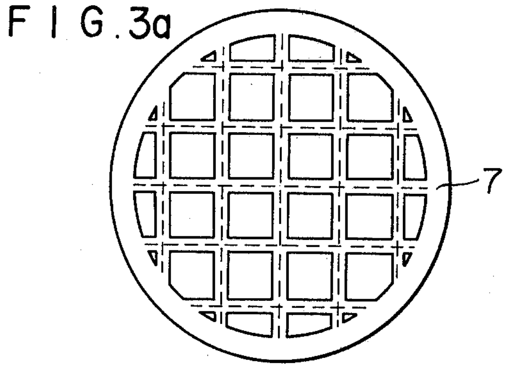
Figure 3B:
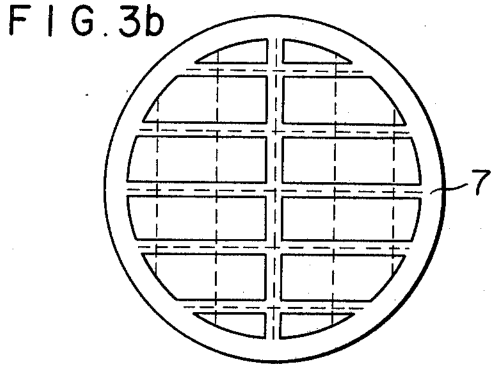
Figure 3C:
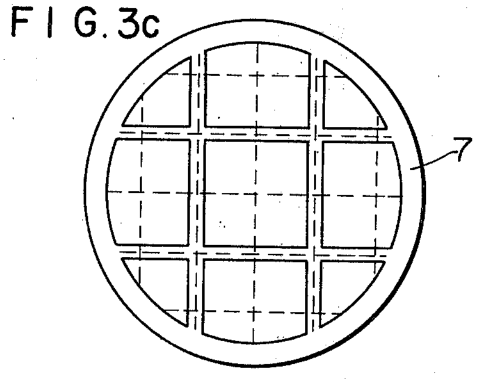

The above and other objects, features and advantages of the present invention will be apparent when the following detailed description is read in conjunction with the accompanying drawings in which:

FIG. 1 illustrates the steps of the method of producing a semiconductor device according to the present invention;

FIGS. 2*a* to 2*i* show the several steps of the process in the fabrication of a transistor according to the present invention; and FIGS. 3*a* to 3*c* are the plan views of backing members used in the present invention.

The main feature of the method of producing a semiconductor device according to the present invention is the steps described below. Namely, a backing member is attached to one surface of a large-area semiconductor wafer having pre-formed PN junctions; the opposite surface of the semiconductor wafer is incised or material-removed so that a plurality of semiconductor pellets are left supported on the backing member; a passivating film is formed on at least that surface of each semiconductor pellet which is formed by incision; and thereafter the individual semiconductor pellets are detached from the backing member. This feature is now described with the aid of FIG. 1.

The method according to the present invention comprises six fundamental steps, i.e. a step of forming PN junctions in a large-area semiconductor wafer, a step of attaching a backing member to the semiconductor wafer, a step of incising the semiconductor wafer to form a plurality of semiconductor pellets supported on the backing member, a step of forming a passivating film on that surface of each semiconductor pellet which is formed through incision, a step of forming electrodes on each semiconductor pellet, and a step of detaching the individual semiconductor pellets from the backing member. In the step of forming the PN junctions, which is the first step in the present method, any desired PN junctions are formed in a well-known manner on a large-area semiconductor wafer cut out of a semiconductor single crystal. The step of attaching the backing member generally follows the first step of forming the PN junctions. The backing member serves to support at a constant interval a plurality of semiconductor pellets formed of the semiconductor wafer in the following step of incision. The backing member must be made of a material which cannot be chemically and physically affected in the steps just after the step of attaching the backing member. Examples are such materials that have a thermal expansion coefficient approximately equal to that of the semiconductor wafer and that are not adversely affected under the temperatures and the atmosphere in which the passivating film is formed, e.g. silicon, quartz, glass, molybdenum, tungsten, chromium, Fe-Ni alloy, Fe-Ni-Co alloy, glass-silicon-glass, molybdenum-silicon-molybdenum, tungsten-silicon-tungsten. The backing member is stuck onto the semiconductor wafer with a binding agent having a melting point higher than the temperatures at which such a passivating film as glass coating is formed. The structure of the backing member will be described later. The step of incising the semiconductor wafer, which step comes after the step of attaching the backing member, is to divide the large-area semiconductor wafer into a plurality of semiconductor pellets. In this step, it is most necessary to incise in such a manner that the edge portion of at least one PN junction appears in the incised surface of each semiconductor pellet and that the individual semiconductor pellets are supported on the backing member. The incision is performed by, for example, etching, air-brushing (sand blast), dicing etc. The step of forming a protective or passivating film, which comes after the step of incision, is also very important in the present method. Inorganic oxides such as silicon oxide, silicon nitride, tantalum oxide or glass are preferable as material for the passivating film and the formation of the film is by sputtering, chemical vapor deposition, sedimentation (in the case of glass) and electrophoresis (in the case of glass). If a silicon oxide film is formed as a protective, passivating film, it is only necessary to oxidize the semiconductor pellets themselves. Also, the passivating film may have a composite structure such as a double layer consisting of a first layer of silicon oxide and a second layer of tantalum oxide. The passivating film is formed to protect the PN junctions appearing in the side surfaces of the semiconductor pellets so that it has to cover the portions of the pellets in which space-charge layers are formed when the PN junctions are inversely biassed. This step includes heat treatment as in the case of glass protective film as well as the formation of inorganic oxide film according to the above described procedure. In the case where a semiconductor device having a high breakdown voltage is fabricated by moulding the semiconductor pellet with resin, a protective glass film is preferable. Such a glass film can be formed by sedimentation or electrophoresis, but the selective formation of the protective film is possible by using a insulating mask so that the electrophoretic method proves most preferable. The step of detaching the semiconductor pellets from the backing member is the last one in the present method. The reason why this is made the last is that the successive steps are rather arbitrary depending upon purposes of application of the present method. Examples of the successive steps are resin mold, can sealing etc. It is, of course, possible that there is substantially no step following the step of detaching the pellets from the backing member. For detaching the pellets, it is preferable to immerse the combination of the semiconductor pellets and the backing member in a solution which solves the binding agent which is applied to fasten the pellets and the backing member firmly together. If there is a danger of the formed electrodes and passivating film being corroded by the solution, they should be previously coated by a protective film.

The step of forming electrodes on the semiconductor pellets may come arbitrarily between the step of forming the PN junctions and the step of detaching the semiconductor pellets from the backing member. However, if that portion of the semiconductor pellet on which electrodes are to formed is covered by the backing member, the electrodes must be formed prior to the step of attaching the backing member. It should here be noted that if the step of forming the electrodes precedes that of forming the passivating film, then a material must be used for the electrodes which is not affected by the temperatures and the atmosphere used in the step of forming the passivating film. For example, in the case where silicon oxide film is formed through thermal oxidization or where a glass film is formed by firing, high temperature of $600°\sim1000°C$ and oxidizing atomosphere are used so that usual electrode material such as A*u* and A*l* cannot be used but that the electrodes must be formed of heat- and oxidation-resistance metal. As a suitable electrode is proposed a composite electrode consisting of a first layer of cobalt or nickel and a second layer of silver or platinum. The electrode of this type enjoys the following merits. The first layer makes a good contact with the semiconductor and hardly makes alloy with the semiconductor even at high temperatures. The second layer is never oxidized even if it is heated in an oxidizing atmosphere and moreover the second layer has a good contact with the first layer and is scarcely alloyed with the material of the first layer. Therefore, the combination of both the layers provides an excellent heat- and oxidation-resistive electrode.

According to the method of producing a semiconductor device as described above, a bevel type semiconductor device whose side faces have PN junctions exposed can be fabricated in a process suitable for mass-production in which process PN junctions, passivating film and electrodes are formed in or on a large-area semiconductor wafer and thereafter the wafer is split into a plurality of pellets. This method, therefore, has the following advantages. Namely, a process can be employed which is suitable for mass production so that the reproducibility is improved and the manufacturing steps are simplified. A bevel type semiconductor device can be formed in a small-area semiconductor pellet so that the resulted device can have a higher breakdown voltage than a planar or mesa type device having the same size. In the conventional bevel type semiconductor device a passivating film was rarely formed on the semiconductor pellet and even in the case where such a passivating film was formed, the treatment was usually performed after the mounting of the pellet onto the container so that the pellet had to be cleaned before mounting. According to the present invention, on the other hand, the step of forming the passivating film is included in the fabricating method. Therefore, the pellet is prevented from contamination before mounting and the step of cleaning can be eliminated.

Next, the present invention will be described by way of embodiment. FIGS. 2*a*-2*i*. shows the process of fabricating a bevel type transistor as an application of the present invention. In the first step of the process, a large-area semiconductor wafer 1 is prepared which has the desired junctions $J_1$ and $J_2$ formed according to a well-known method such as diffusion or epitaxial growth, as shown in FIG. 2*a*. On one surface 11 of the principal surfaces of the semiconductor wafer 1 is formed an oxide film 2 while oxide films 3 and 4 are formed respectively on the portions of the other principal surface 12 where the PN junctions are exposed and the portions of the surface 12 where the wafer 1 is to be split through incision, electrode 5 being provided on the remaining portion of the surface 12, as shown in FIG. 2*b*. The electrode 5 is made of heat- and oxidation-resistive metal. In FIG. 2*b*, an insoluble coating 6 of silicon nitride or tantalum oxide is provided between the oxide film 4 and the electrode 5. With this structure, the insoluble film 6 is indispensable when etching is used for incision and the electrode 5 on the insoluble film 6 is necessary when a passivating film is formed by electrophoresis as disclosed in the U.S. Pat. Specification No. 3280019. Therefore, such an insoluble film 6 is not required there neither etching or electrophoresis is used. Then, a grid-shaped backing member 7 is stuck onto the surface 12 of the semiconductor wafer 1 with a binder layer 8 such as glass, as shown in FIG. 2*c*. It is preferable to register the grid-shaped backing member 7 onto the semiconductor wafer 1 in such a manner that the grid of the member 7 may lie exactly on the portions of the electrode 5 on the insoluble film 6. Preferably, the backing member 7 may have a plurality of openings to expose the electrodes 5, as shown in the oblique line portions in FIG. 2*c*. Thereafter, the oxide film 2 is selectively removed, as shown in FIG. 2*d*. A mask 9, which has a resistivity against corrosion by an etchant for incising the semiconductor wafer 1, is provided on the oxide film 2 depending on purposes. With the oxide film 2 and the mask 9 used as an etching mask, the semiconductor wafer 1 is etched and split into a plurality of semiconductor pellets 10, as shown in FIG. 2*e*. As a result of this etching treatment, the PN junction $J_2$ appears exposed in the side surface of the semiconductor pellet 10 formed by etching. The thus divided semiconductor pellets are supported on the backing member 7 so that the relative disposition and flatness of the pellets remain the same as before the etching treatment. The insoluble film 6 serves to prevent etching from reaching the binder layer 8 and the backing member 7. Usually, the speed of etching is not uniform over the surface of the semiconductor wafer 1 so that the time of etching is set according to a period required to etch that portion of the wafer 1 which is corroded most slowly. Therefore, the insoluble film 6 can play its role in the case where a certain portion is etched away to fast. The side surfaces 101 of the semiconductor pellets 10 formed due to etching are coated with a glass film 21 through electrophoresis, as shown in FIG. 2*f*. Material for the glass film 21 is preferably zinc boro-silicate glass such as No. 351 manufactured by General Electric Company in USA. The semiconductor pellets 10 are electrically connected with one another by the electrodes 5 and no special means to connect one of the pellets 10 with another is needed.

Accordingly, the glass film can be formed by electrophoretic method. The glass film 21 is vitrified by firing treatment. After the completion of the glass film 21, the oxide film 2, except its edge portion, is removed so that the exposed surface 11 of the semiconductor pellet 10 is provided with an electrode 22, as shown in FIG. 2*g*. The semiconductor pellet thus treated is then immersed in a solder bath to form solder layers 23 on the electrodes 5 and 22, as shown in FIG. 2*h*. Finally, the semiconductor pellet 10 supported on the backing member 7, with the glass film 21 coated by acid-protective wax (for example, apiezon wax), is immersed in an acid solution to solve the binder layer 8 and to separate the semiconductor pellet 10 from the backing member 7 and the oxide film 4, the insoluble film 6 and the electrode 5 are mechanically cut to fabricate the semiconductor device as shown in FIG. 2*i*. Thereafter, can sealing or resin molding may be applied.

The backing member 7 in FIGS. 2*c*-2*i* is described as having a shape of grid The merit of the shape of a grid compared with the shape of a plate is to facilitate the etching of the binder layer 8 to separate the semiconductor pellets 10 from the backing member 7 and to facilitate the forming of the solder layer on the electrodes 5. FIGS. 3*a* to 3*c* show embodiments of the backing member 7. The embodiment shown in FIG. 3*a* has the same grid pattern as the grid lines on the semiconductor wafer (represented by dotted lines in FIGS. 3*a* to 3*c*) along which lines the wafer is incised to produce a plurality of pellets. This embodiment is suitably applicable to a comparatively large-area semiconductor wafer. On the other hand, the embodiments shown in FIGS. 3*b* and 3*c* has a grid pattern coarser than the grid of incision and therefore is applicable to a comparatively small-area semiconductor wafer.

In conclusion, the result of the thus fabricated semiconductor device is numerically described. A semiconductor device, as shown in FIGS. 2*a*-2*i* having a structure of a bevel type NPN transistor having a shape of square of 4.8mm × 4.8mm with a glass film of 20 to 40$\mu$ on the side surfaces, was formed of a semiconductor wafer having a resistivity of 60 to 80$\omega$. cm and a thickness of 180$\mu$ according to the present method. This device was then subjected to a 16-hour pressure cooker test under the temperature of 120°C and the steam pressure of 2 atms. After the test, the device had a breakdown voltage higher than 1500V. Thus, according to the present invention, a semiconductor device which has a by far higher breakdown voltage than a planar or mesa type semiconductor device, can be provided. In order to attain such a high breakdown voltage as mentioned above with a planar type semiconductor device, it is necessary to provide five guard rings (superposed one upon another) to cover the exposed PN junction. Accordingly, in order to attain the same current capacity as attained according to the present invention with the planar type device, a semiconductor pellet having a shape of square having dimensions of more than 6.0mm × 6.0mm must be used. As seen from the above description, according to the present invention, a much smaller semiconductor pellet can be used to form a semiconductor device in comparison with that of a planar or mesa type device.

We claim:

1. A method of producing a semiconductor device, comprising a first step of forming desired PN junctions in a large-area semiconductor wafer, a second step of attaching a backing member to one of the principal surfaces of said semiconductor wafer by use of an adhesive binding layer, said backing member having apertures therethrough exposing said one principal surface of the wafer and lateral portions of said binding layer, a third step of incising selectively said semiconductor wafer from the other principal surface to said one principal surface to form a plurality of small-area semiconductor pellets each having at least one PN junction exposed in the surface formed due to the incision, a fourth step of forming a glass film on that surface of each semiconductor pellet formed due to the incision, a fifth step of detaching said semiconductor pellets from said backing member by etching said binding layer through said exposed lateral portions, and a sixth step of forming electrodes on said semiconductor pellets between said first and fifth steps.

2. A method as claimed in claim 1, said glass film is formed by using electrophoresis.

3. A method as claimed in claim 2, wherein an electrode is formed on said one principal surface of said semiconductor wafer before the attachment of said backing member so that said plurality of pellets are electrically connected with one another.

4. A method as claimed in claim 1, wherein said backing member has the shape of a grid.

5. A method as claimed in claim 4, wherein said glass film is formed by electrophoresis.

6. A method as claimed in claim 4, wherein an electrode is formed on said one principal surface of said semiconductor wafer before the attachment of said backing member so that said plurality of pellets are electrically connected with one another.

7. A method as claimed in claim 1, wherein when said sixth step is performed before said fourth step said electrodes are formed of heat - and oxidation-resistive metal.

8. A method as claimed in claim 7, wherein each of said electrodes comprises a first layer of a material selected from the group consisting of cobalt and nickel kept in contact with said semiconductor pellet, and a second layer of a material selected from the group consisting of silver and platinum, kept in contact with said first layer.

9. A method of producing a semiconductor device, comprising the steps of:

a. forming desired PN junctions in a large-area semiconductor wafer;
b. attaching a backing member to one of the principal surfaces of said semiconductor wafer by use of an adhesive binding layer, said backing member having a plurality of openings to expose portions of said one of the principal surfaces of said semiconductor pellets on which electrodes are to be formed and lateral portions of said binding layer;
c. incising said semiconductor wafer from the other principal surface to said one principal surface to form a plurality of small-area semiconductor pellets each having at least one PN junction exposed in the surface formed due to the incision;
d. forming a passivating film on that surface of each semiconductor pellet formed due to the incision;
e. detaching said semiconductor pellets from said backing member by removing said binding layer through said exposed lateral portions thereof; and
f. forming electrodes on said portions of one of the principal surfaces of said semiconductor pellets between said steps (a) and (e),

10. A method as claimed in claim 9, further comprising the step (g) of forming solder layers on said electrodes after said step (f).

* * * * *